US012394911B2

(12) United States Patent
Ghosh et al.

(10) Patent No.: US 12,394,911 B2
(45) Date of Patent: Aug. 19, 2025

(54) ANTI-REFLECTIVE ASSEMBLIES

(71) Applicant: 3M INNOVATIVE PROPERTIES COMPANY, St. Paul, MN (US)

(72) Inventors: Dipankar Ghosh, Oakdale, MN (US); Weigang Lin, Shanghai (CN); Jie Huang, Shanghai (CN); Min Ding, Shanghai (CN); Wei Li, Shanghai (CN); Kun Wang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 155 days.

(21) Appl. No.: 18/552,680

(22) PCT Filed: Mar. 4, 2022

(86) PCT No.: PCT/IB2022/051945
§ 371 (c)(1),
(2) Date: Sep. 27, 2023

(87) PCT Pub. No.: WO2022/214886
PCT Pub. Date: Oct. 13, 2022

(65) Prior Publication Data

US 2024/0162624 A1 May 16, 2024

Related U.S. Application Data

(60) Provisional application No. 63/172,456, filed on Apr. 8, 2021.

(51) Int. Cl.

| | |
|---|---|
| ***H01Q 17/00*** | (2006.01) |
| ***H01Q 1/24*** | (2006.01) |
| ***H01Q 1/42*** | (2006.01) |

(52) U.S. Cl.
CPC ........... *H01Q 17/007* (2013.01); *H01Q 1/243* (2013.01); *H01Q 1/422* (2013.01)

(58) Field of Classification Search
CPC ........ H01Q 17/007; H01Q 1/243; H01Q 1/42; H01Q 1/422
See application file for complete search history.

(56) References Cited

U.S. PATENT DOCUMENTS 2,659,884 A 11/1953 Mcmillan et al.
2,956,288 A 10/1960 James
(Continued)

FOREIGN PATENT DOCUMENTS

EP 3799402 A1 3/2021
WO 2019193530 A1 10/2019
(Continued)

OTHER PUBLICATIONS

Ghosh, "Hybrid Dielectric Thin Films on Flexible Substrates for Embedded Capacitor Applications", IEEE Transactions on Components, Packaging And Manufacturing Technology, 2016, vol. 06, No. 06, pp. 941-945.
(Continued)

*Primary Examiner* — Daniel Munoz
(74) *Attorney, Agent, or Firm* — Bradford B. Wright

(57) ABSTRACT

Anti-reflective assemblies comprise: a high dielectric permittivity substrate comprising a ceramic and a nonporous multilayer anti-reflective film contacting or adhesively bonded to the substrate. The nonporous multilayer anti-reflective film comprises sequential first, second, and third layers of sequentially decreasing dielectric permittivity. Each layer comprises a respective polymer matrix and filler particles.

20 Claims, 14 Drawing Sheets

(56) References Cited

U.S. PATENT DOCUMENTS

| | | | | |
|---|---|---|---|---|
| 3,780,374 | A | 12/1973 | Shibano et al. | |
| 5,017,939 | A | 5/1991 | Wu | |
| 5,408,244 | A | 4/1995 | Mackenzie | |
| 5,757,331 | A | 5/1998 | Yoneyama et al. | |
| 9,704,613 | B2 | 7/2017 | Ghosh et al. | |
| 10,411,320 | B2 | 9/2019 | Weinmann et al. | |
| 10,658,724 | B2 | 5/2020 | Kim et al. | |
| 2004/0246194 | A1 | 12/2004 | Usami et al. | |
| 2013/0278468 | A1 | 10/2013 | Yehezkely et al. | |
| 2015/0302990 | A1 | 10/2015 | Ghosh et al. | |
| 2017/0201011 | A1 | 7/2017 | Khripkov et al. | |
| 2018/0212317 | A1 | 7/2018 | Hutcheson et al. | |
| 2019/0267718 | A1 | 8/2019 | Rajagopalan et al. | |
| 2020/0212542 | A1 | 7/2020 | Yong et al. | |
| 2020/0251828 | A1* | 8/2020 | Banerjee | C09D 5/32 |
| 2021/0021050 | A1 | 1/2021 | Kim et al. | |

FOREIGN PATENT DOCUMENTS

| | | | |
|---|---|---|---|
| WO | 2020188371 | A1 | 9/2020 |
| WO | 2022018585 | A1 | 1/2022 |
| WO | 2022133773 | A1 | 6/2022 |

OTHER PUBLICATIONS

Ghosh, "Structural And High GHz Frequency EMI (Electromagnetic Interference) Properties of Carbonyl Iron And Boron Nitride Hybrid Composites", Materials Research Express, 2019, vol. 06, No. 10, 106305, pp. 1-12.

Ghosh, "Tunable High-Quality-Factor Interdigitated (Ba, Sr) TiO3 Capacitors Fabricated on Low-Cost Substrates With Copper Metallization", Thin Solid Films, 2006, vol. 496, No. 02, pp. 669-673.

Huang, "Influence Analysis of ZrO2 Ceramic for Cellular Phones on 5G mm-Wave Antenna Performance", IEEE Asia-Pacific Conference on Antennas and Propagation (APCAP), 2018, pp. 420-424.

International Search Report for PCT International Application No. PCT/IB2022/051945, mailed on May 31, 2022, 5 pages.

Oh, "Microwave dielectric properties of zirconia fabricated using NanoParticle Jetting", Additive Manufacturing, 2019, vol. 27, pp. 586-594.

Raut, "Anti-Reflective Coatings: A Critical, In-Depth Review", Energy & Environmental Science, 2011, vol. 04, pp. 3779-3804.

Wang, "Graded-Index Fluoropolymer Antireflection Coatings for Invisible Plastic Optics", Nano Letters, 2019, vol. 19, No. 02, pp. A-F.

* cited by examiner

ANTI-REFLECTIVE ASSEMBLIES

TECHNICAL FIELD

The present disclosure broadly relates to materials and components useful for wireless telecommunication.

BACKGROUND

The 5th generation, or 5G, communication standard is an evolutionary change in wireless communication technologies with the goal of improving data transfer speeds, latency, reliability, and enabling denser wireless communication coverage. The 5G standard adds additional spectrum to achieve wider bandwidths, proposing spectrum allocations near 3.5 gigahertz (GHz) and multiple bands in the 24-40 GHz range (24-60 GHz). The wavelengths in the 24-40 GHz range are often referred to as mm-wave, and due to the large available bandwidths, these frequencies are often referred to as ultra-wide band (UWB). Two frequency ranges, 24.25-29.5 GHz and 37-40 GHz are often used in 5G UWB for mobile device communication.

5G Telecommunication signals are highly directional. Most of these super-high frequency signals work only if there is a clear, direct line-of-sight between the transmitting station and the device receiving the signal. And, some of these higher frequencies are easily absorbed by humidity, rain, and other objects, meaning that they don't travel as far as 4G or 3G signals with lower frequency ranges.

Some cell phone manufacturers use a ceramic (e.g., zirconia) back case for premium quality 5G mobile devices for aesthetic and superior mechanical property reasons. However, such ceramic materials typically have high dielectric permittivity values in the GHz frequency band. Accordingly, they can also act as a barrier for 5G signal transmission because of impedance mismatch between air and the ceramic back case. For example, signal loss due to reflection be as much as 30 to 50 percent.

SUMMARY

It would be desirable to have materials and components that reduce signal loss due to reflection by ceramic cases in 5G telecommunications devices. The present disclosure provide such materials and components.

Accordingly, in one aspect, the present disclosure provides an anti-reflective assembly comprising:

- a substrate comprising a ceramic and having first and second major surfaces, wherein the substrate has a dielectric permittivity of at least 10 over at least an 8 gigahertz continuous portion of an electromagnetic frequency range from 3 to 40 gigahertz, inclusive;
- an adhesive layer disposed on at least a portion of the first major surface; and
- a nonporous multilayer anti-reflective film contacting the adhesive layer and disposed proximate to the substrate, the nonporous multilayer anti-reflective film comprising sequential first, second, and third layers, wherein:
  - the first layer comprises a first polymer matrix containing first filler particles, wherein over the at least an 8 GHz continuous portion of the electromagnetic frequency range, the first layer has a first dielectric permittivity of 10 to 15 and a first dielectric loss tangent of 3 percent or less;
  - the second layer comprises a second polymer matrix containing second filler particles, wherein over the at least an 8 GHz continuous portion of the electromagnetic frequency range, the second layer has a second dielectric permittivity of 3 to 10 and a second dielectric loss tangent of 3 percent or less; and
  - the third layer comprises a third polymer matrix containing third filler particles, wherein over the at least an 8 GHz continuous portion of the electromagnetic frequency range, the third layer has a third dielectric permittivity of 1 to 5 and a third dielectric loss tangent of 3 percent or less,
  - wherein the first dielectric permittivity is greater than the second dielectric permittivity, and the second dielectric permittivity is greater than the third dielectric permittivity.

In another aspect, the present disclosure provides an anti-reflective assembly comprising:

- a substrate comprising a ceramic and having first and second major surfaces, wherein the substrate has a dielectric permittivity of at least 10 over at least an 8 gigahertz continuous portion of an electromagnetic frequency range from 3 to 40 gigahertz, inclusive; and
- a nonporous multilayer anti-reflective film contacting the substrate, the nonporous multilayer anti-reflective film comprising sequential first, second, and third layers, wherein:
  - the first layer comprises a first polymer matrix containing first filler particles, wherein over the at least an 8 GHz continuous portion of the electromagnetic frequency range, the first layer has a first dielectric permittivity of 10 to 15 and a first dielectric loss tangent of 3 percent or less;
  - the second layer comprises a second polymer matrix containing second filler particles, wherein over the at least an 8 GHz continuous portion of the electromagnetic frequency range, the second layer has a second dielectric permittivity of 3 to 10 and a second dielectric loss tangent of 3 percent or less; and
  - the third layer comprises a third polymer matrix containing third filler particles, wherein over the at least an 8 GHz continuous portion of the electromagnetic frequency range, the third layer has a third dielectric permittivity of 1 to 5 and a third dielectric loss tangent of 3 percent or less,
  - wherein the first dielectric permittivity is greater than the second dielectric permittivity, and the second dielectric permittivity is greater than the third dielectric permittivity.

As used herein:

- properties relating to materials in this application refer to properties measured at 20° C. and 1 atmosphere (101.325 kPa) of pressure unless otherwise noted;
- the terms "permittivity" and "dielectric permittivity" refer to dielectric permittivity unless otherwise specified; and
- the term "proximate" means very near to (e.g., within a distance of about 150 microns or even contacting).

As used herein, numerical ranges are inclusive of their end points unless specifically otherwise indicated.

Features and advantages of the present disclosure will be further understood upon consideration of the detailed description as well as the appended claims.

Figure 1:
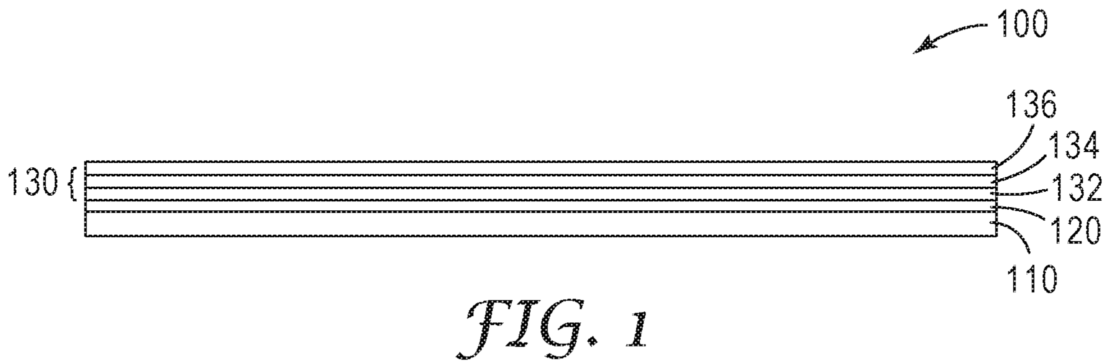
FIG. 1 is a schematic side view of an exemplary anti-reflective assembly 100 according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

FIG. 1 depicts an exemplary anti-reflective assembly 100 according to the present disclosure. Referring now to FIG. 1, substrate 110 has first and second major surfaces 112, 114. Substrate 110 comprises a ceramic that has a substrate dielectric permittivity of at least 10 over at least an 8 GHz (e.g., at least 8, at least 10, at least 12, at least 14 GHz, at least 22 GHz or even at least 37 GHz) continuous portion of an electromagnetic frequency range between 3 and 40 GHz, inclusive. As used herein, the at least 8 GHz continuous frequency range over which dielectric permittivity and loss are specified for the substrate, first layer, second layer, and third layer is the same for all layers, although the selection of the frequency range may vary anywhere in the range of 3 and 40 GHz. For example, the at least 8 GHz continuous frequency range may be 3 to 40 GHz, 18 to 26 GHz, 10 to 18 GHz, 3 to 18 GHz, or 26 to 40 GHz.

Substrate 110 may have any size and shape size; however, it preferably has a thickness of 0.05 to 1 millimeter (mm), more preferably 0.1 to 1 mm, and even more preferably 0.1 to 0.8 mm. In many preferred embodiments, the substrate comprises at least a portion of a case for a 5G telecommunication device such as, for example, a cellular phone (also including smart phones) or a tablet computer. In many embodiments, the at least a portion of a case comprises a back cover opposite an electronic display surface. Exemplary substrates having a dielectric permittivity over a continuous electromagnetic frequency range between 3 and 40 GHz of at least 10 (e.g., at least 10, at least 15, or even at least 20) include ceramics such as zirconia, doped zirconia, sapphire, and silicon nitride.

Adhesive layer 120 is disposed on first major surface 112. Adhesive layer 120 may comprise any suitable adhesive material. Examples include pressure-sensitive adhesives (e.g., acrylic pressive-sensitive adhesives), hot melt adhesives (e.g., styrenic hot melt adhesives), thermosetting adhesives (e.g., epoxies and polyurethanes). While the adhesive layer may degradation of anti-reflective properties of the anti-reflective assembly, if it is sufficiently thin such degradation will be negligible or otherwise at least acceptable. Accordingly, in many embodiments it is desirable that the adhesive layer has an thickness of 100 microns or less, although greater thicknesses may also be used. The adhesive layer may be porous, nonporous, and/or discontinuous. Preferably, it is nonporous and not discontinuous.

Nonporous multilayer anti-reflective film 130 comprises sequential first, second, and third layers (132,134,136). First layer 132 of nonporous multilayer anti-reflective film 130 contacts adhesive layer 120.

The nonporous multilayer anti-reflective film 130 may have any desired thickness, but often has an thickness of 0.05 mm to 3.0 mm, preferably 0.1 mm to 2.0 mm. In some embodiments, the nonporous multilayer anti-reflective film 130 is formed to conform to the surface of the back cover of a 5G telecommunication device such as, for example, a cellular phone or tablet computer.

While not a requirement, it is often preferable that the dielectric permittivity and dielectric loss tangent values of the nonporous multilayer anti-reflective film does not vary by more than 15 percent over the at least 8 GHz continuous electromagnetic frequency range at room temperature First layer 132 comprises a first polymer matrix containing first filler particles (both not shown). Likewise, the second layer 134 comprises a second polymer matrix containing second filler particles (both not shown), and the third layer 136 comprises a third polymer matrix containing third filler particles (both not shown).

Over at least an 8 GHz continuous portion of an electromagnetic frequency range from 3 to 40 GHz, the first layer has a first dielectric permittivity of 10 to 15 and a first dielectric loss tangent of 3 percent or less (e.g., less than two percent or even less than one percent). Likewise, the second layer has a second dielectric permittivity of 10 to 15 and a second dielectric loss tangent of 3 percent or less (e.g., less than two percent or even less than one percent). Additionally, the third layer has a third dielectric permittivity of 10 to 15 and a third dielectric loss tangent of 3 percent or less (e.g., less than two percent or even less than one percent).

In some embodiments, on a respective basis, the weight percent of the first, second, and third filler particles in the first second, and third layers decreases sequentially. In some embodiments, the first, second, and third filler particles are compositionally the same, even though with different filler loading The first, second, and third layers (132, 134, 136) are configured such that, over the at least an 8 GHz continuous portion of an electromagnetic frequency range from 3 to 40 GHz, the first dielectric permittivity is greater than the second dielectric permittivity, and the second dielectric permittivity is greater than the third dielectric permittivity. While a degree of overlap may exist in dielectric permittivity ranges for the first, second, and third layers, importantly no two layers may have dielectric permittivity values that are not in the required sequential order set forth above.

dielectric permittivity of the first, second, and third layers may be affected by the choice of the corresponding filler particles and, to a lesser degree, by the choice of the polymer matrix in which they is dispersed. dielectric permittivity may also be affected by the concentration of filler particles, porosity, water content, and the layer thickness, for example. Lastly, dielectric permeability is generally wavelength dependent and will vary depending on the specific wavelength range selected. dielectric loss tangent may depend on the temperature of the material, its density, composition, and structure, for example.

The first, second, and third layers (132, 134, 136) are configured such that the first dielectric permittivity is greater than the second dielectric permittivity, and the second dielectric permittivity is greater than the third dielectric permittivity. While a degree of overlap may exist in dielectric permittivity ranges for the first, second, and third layers, importantly no two layers may have dielectric permittivity values that are not in the required sequential order set forth above.

As used herein, the term "nonporous" used in reference to a layer means that the layer is essentially free of (e.g., less than 1 volume percent of, or even free of) internal voids and free of holes and discontinuities extending through the layer, but may optionally exclude minor random defects that occur during manufacture of the layer.

Nonporous multilayer anti-reflective film 130 may have any dimensions. For many applications the nonporous multilayer anti-reflective film has an overall film thickness preferably 0.05 to 1.5 millimeters, more preferably 0.05 to 1 mm, and is preferably adapted to be secured proximate to most or all of the first major surface 132 of the substrate 110.

The nonporous multilayer anti-reflective film 130 comprises sequential first, second, and third layers (132,134, 136). Often, the first, second, and third layers (132,134,136) respectively contact each other in a consecutive manner. However, intermediate layers such as, for example, adhesive layers are also permissible.

Each of the first, second, and third layers comprises a respective polymer matrix containing respective ceramic, electrically insulating filler particles. The amount of filler in each of the first, second, and third layers may advantageously vary to provide varying dielectric permittivities and dielectric loss tangents, with lower filler amounts typically being associated with higher dielectric permittivity. Likewise, the dielectric permittivity of the filler and the layer dimensions (e.g., length, width, and thickness), will also have an effect on the dielectric permittivity of each layer. Hence, layers with identical components but different concentrations of the components and/or layer thicknesses may achieve the desired dielectric permittivity and dielectric loss tangent.

Suitable materials for the polymer matrix of the first, second and third layers, which may be the same or different include, for example, thermoplastic and thermoset polymeric materials. Examples include silicones, polyolefins (e.g., cyclic olefin copolymers (COC), low-density polyethylene (LDPE), high-density polyethylene (HDPE), polystyrene (PS), polypropylene (PP)), homopolymers and copolymers of fluorinated alkenes (e.g., vinylidene fluoride, tetrafluoroethylene, and/or hexafluoropropylene), polyamides, polyphenylene sulfide (PPS), polyimides (PI), syndiotactic polystyrene (SPS), butyl rubber, polyacrylonitrile-co-butadiene-co-styrene (ABS), polycarbonate (PC), polyurethane, cured epoxy resins, and acrylic polymers (e.g., made by polymerization of corresponding acrylic monomers), and combinations thereof.

Suitable filler particles for the first, second, and third layers may comprise ceramic metal oxides such as magnetoplumbite-type magnetic ceramics, spinel-type magnetic ceramics, and garnet-type magnetic ceramics, for example. In some embodiments, the ceramic metal oxides comprises a ferrite ceramic. Some examples include $M^2Fe_{12}O_{19}$, $M^3Fe_2O_4$, $M^4{}_3Fe_2Si_3O_{12}$, wherein $M^2$ is selected from one or more of Ba, Pb; $M^3$ is selected from one or more of Mg, Mn, Ni, Fe, Cd, Cu; and $M^4$ is selected from one or more of Y, Sm, Eu, Dy, Tm. In some embodiments, suitable ceramic metal oxides comprise mixed ceramics, the oxide ceramic filler may further comprise one or a plurality of items selected from the group consisting of $TiO_2$ and $M^1TiO_3$, wherein $M^1$ is selected from one or more of Sr, Ba, Ca. In many embodiments, the filler particles comprise doped or undoped Mania ($TiO_2$), zirconia ($ZrO_2$), barium titanate ($BaTiO_3$), barium strontium titanate ($BaSrTiO_3$), barium zirconium titanate ($BaZrTiO_3$), barium hafnium titanate ($BaHfTiO_3$), calcium copper titanate ($CaCu_3Ti_4O_{12}$), lead titanate ($PbTiO_3$), lead magnesium titanate ($PbMgTiO_3$), iron titanium tantalate ($FeTiTaO_6$), NiO co-doped with Li and Ti($La_{1.5}Sr_{0.5}NiO_4$, $Nd_{1.5}Sr_{0.5}NiO_4$), $BaFe_{12}O_{19}$, $SrTiO_3$, $SrFe_{12}O_{19}$, and combinations thereof.

In some embodiments, the first filler particles comprise a metal ceramic oxide with a dielectric permittivity of at least 100 (e.g., $BaTiO_3$). In some embodiments, the second filler particles comprise a metal ceramic oxide with a dielectric permittivity of at least 50 (e.g., $BaZrTiO_3$). In some embodiments, the third filler particles comprise a metal ceramic oxide with a dielectric permittivity of at least 10 (e.g., $ZrO_2$).

Any amount of filler particles can be included in the first, second, and third layers of the nonporous multilayer anti-reflective. Often, the filler content in the first, second, and/or third layers is at least 50 percent by weight (wt. %), at least 60 wt. %, at least 70 wt. %, at least 80 wt. %, or even at least 90 wt. %.

Figure 2:
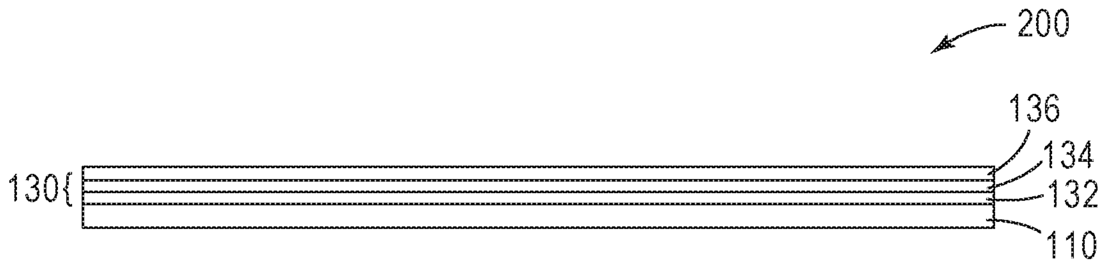
FIG. 2 is a schematic side view of an exemplary anti-reflective assembly 200 according to the present disclosure.

Referring now to FIG. 2, a second embodiment of a nonporous multilayer anti-reflective film 200 according to the present disclosure uses components described in FIG. 1, except that the adhesive layer is omitted. In this embodiment, first layer 132 of nonporous multilayer anti-reflective film 130 contacts substrate 110. This embodiment may be used, for example, if the nonporous multilayer anti-reflective film is mechanically held in place proximate the substrate, or if the first layer has adhesive properties.

Nonporous multilayer anti-reflective films according to the present disclosure can be made, for example, by conventional methods. Examples may include, heat and or pressure lamination, solution casting, coextrusion and combinations of the above. The nonporous multilayer anti-reflective film can be mechanically clipped or otherwise positioned proximate (e.g., contacting) the substrate, or in the case of the embodiment shown in FIG. 1, adhered via the adhesive layer.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Abbreviations for materials used in this section, as well as descriptions of the materials, are reported in Table 1, below.

TABLE 1

| Material | Details |
|---|---|
| $ZrO_2$ | Zirconia powder, $d_{50}$ = 0.5 micron, obtained from Sigma-Aldrich, St. Louis, Missouri |
| $BaTiO_3$ | $BaTiO_3$ powder, $d_{50}$ = 0.5 micron, obtained from Nippon Chemical Industrial Co. Ltd., Tokyo, Japan |
| $BaZrTiO_3$ | $BaZrTiO_3$ powder, $d_{50}$ = 0.5 micron, obtained from Nippon Chemical Industrial Co. Ltd. |
| Silicone | Silicone elastomer obtained as SYLGARD 184 SILICONE ELASTOMER KIT from Dow, Midland, Michigan |

Measurement of Dielectric and Magnetic Properties of Composites

Polymer composite materials filled with ceramic powders were prepared. and Silicone was used as a polymer matrix material. Silicone, Part A, was put into a plastic cup and Silicone Part B, curing agent was added, such that the ratio of part A to part B was 10:1 by weight. Stoichiometric amount of ceramic powders ($ZrO_2$, $BaZrTiO_3$, and $BaTiO_3$) were added as filler materials. The plastic cups were covered with caps that allowed speed mixing under vacuum (10 kPa) for a total time of 2 min and 15 s. The mixtures were then poured within stainless-steel metal plates (20 cm by 20 cm by 0.5 cm) used as a mold and appropriate aluminum spacers for making approximately 5 cm by 5 cm by 0.1 cm thick samples. The plates were pressed for 45-60 min at 118° C. at a pressure of 3 tons (907 kg). The plates were cooled down for 30-45 min before taking out the samples.

Complex dielectric and magnetic properties of the composites were calculated from scattering parameters obtained using an Agilent E8364C PNA Network Analyzer (Santa Clara, California) over the frequency range of 18-26.5 GHz (K Band) using rectangular waveguides at room temperature. Multiple samples were cut from different areas of the silicone composite to fit into the waveguides. For K band measurements, the sample dimensions were: 10.66 mm×4.31 mm×1.00 mm. To ensure accurate measurements and minimize air gap inside waveguides, great care was taken so that the samples were of uniform thickness with smooth topography. Wherever possible, errors associated with the airgaps were corrected, and a full uncertainty analysis was done to ensure repeatability and accuracy of the measurements.

Figure 3:
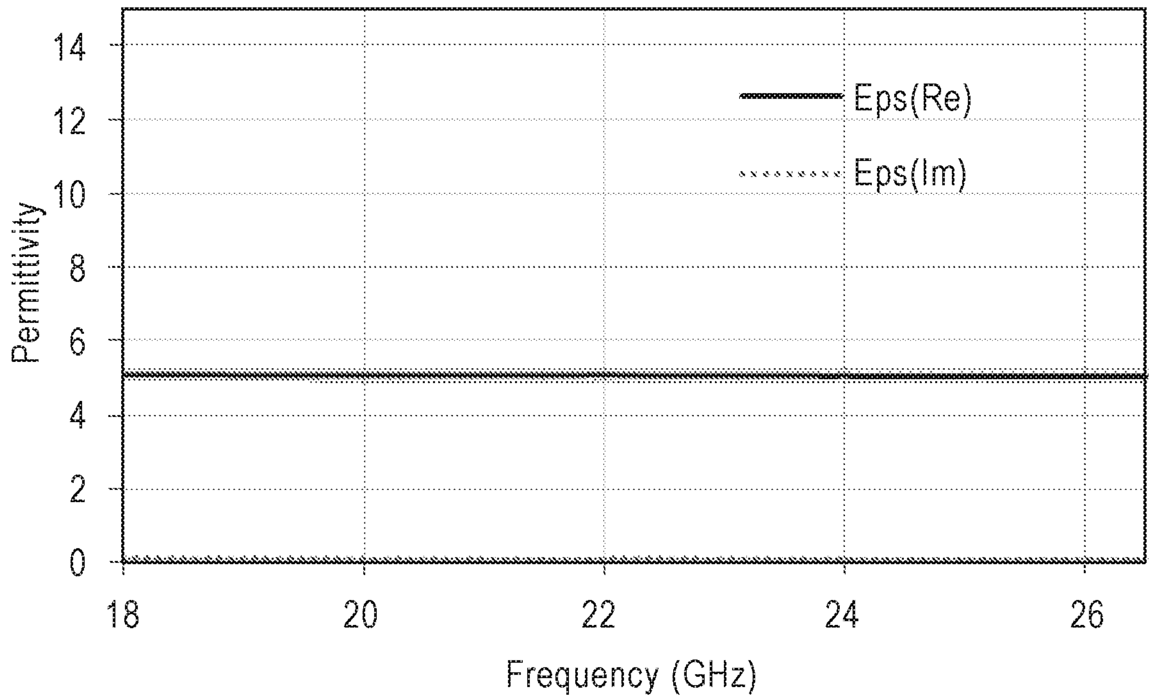
FIGS. 3 and 4 are respective plots of the real and imaginary parts of dielectric permittivity and magnetic permeability vs. frequency (18-26 GHz) for $ZrO_2$ filler (70 weight percent loading in a silicone polymer matrix) composite
Figure 4:
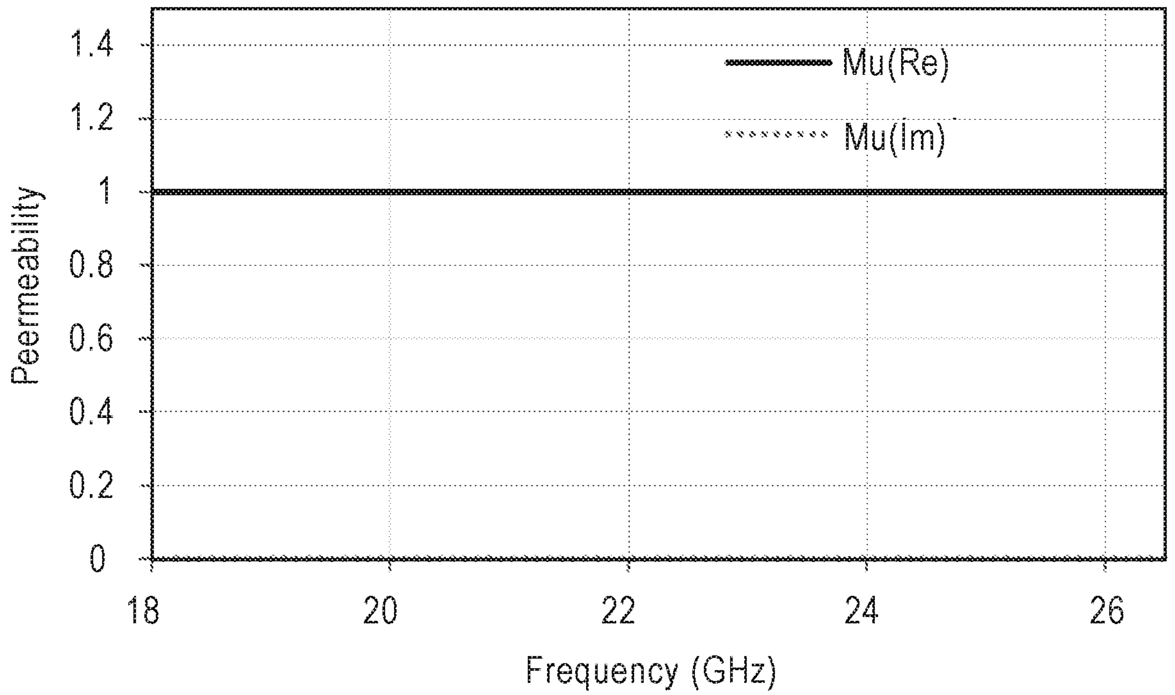
Figure 5:
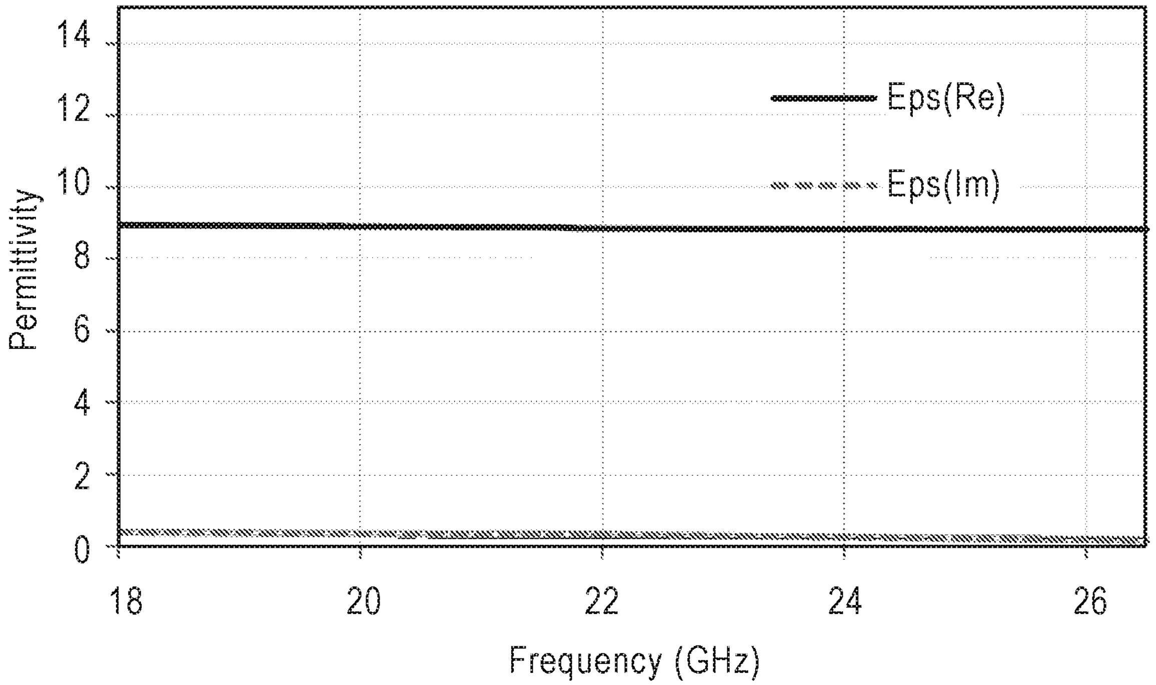
FIGS. 5 and 6 are respective plots of the real and imaginary parts of dielectric permittivity and magnetic permeability vs. frequency (18-26 GHz) for $BaZrTiO_3$ filler (70 weight percent loading in a silicone polymer matrix) composite.
Figure 6:
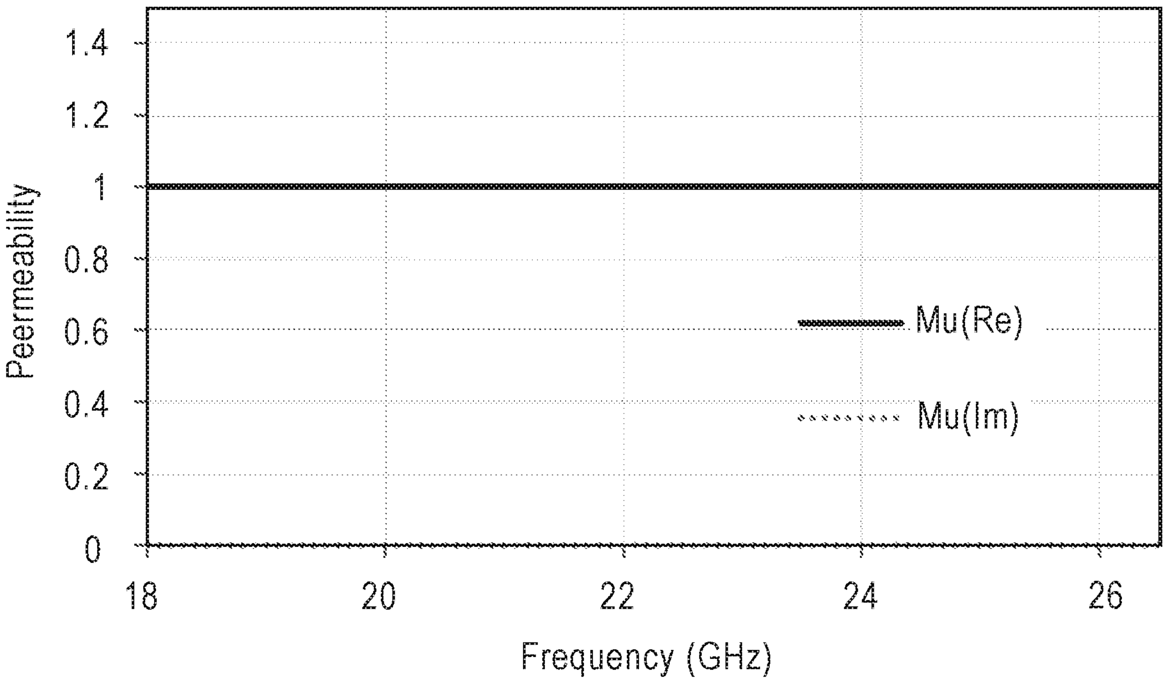
Figure 7:
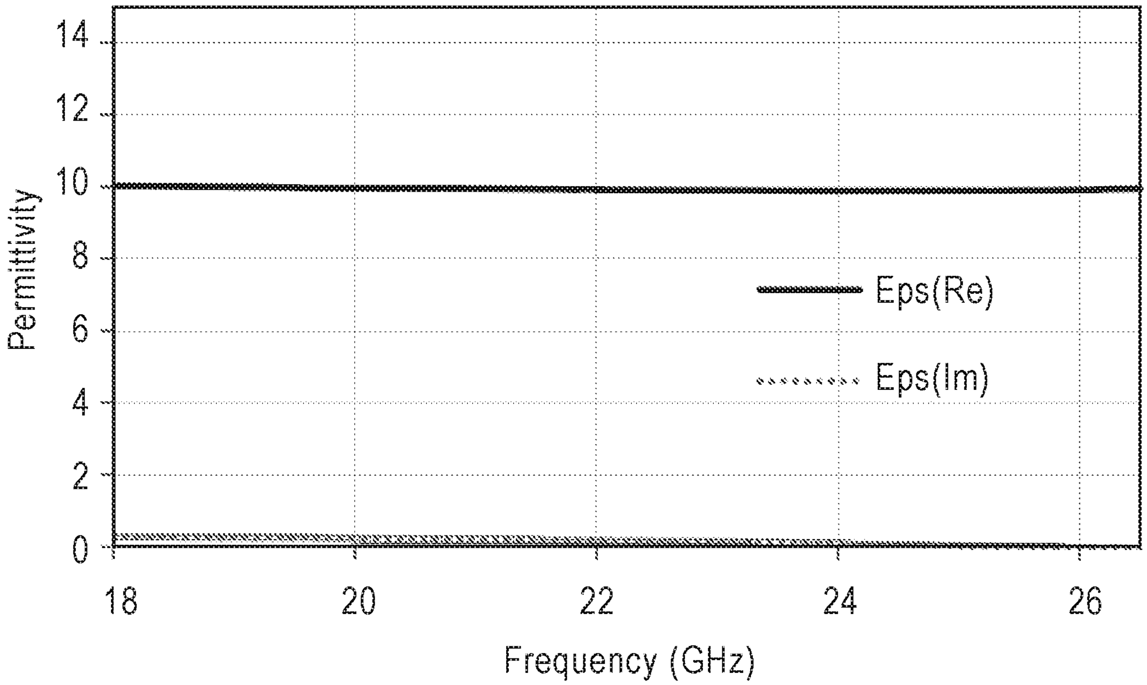
FIGS. 7 and 8 are respective plots of the real and imaginary parts of dielectric permittivity and magnetic permeability vs. frequency (18-26 GHz) for $BaTiO_3$ filler (70 weight percent loading in a silicone polymer matrix) composite.
Figure 8:
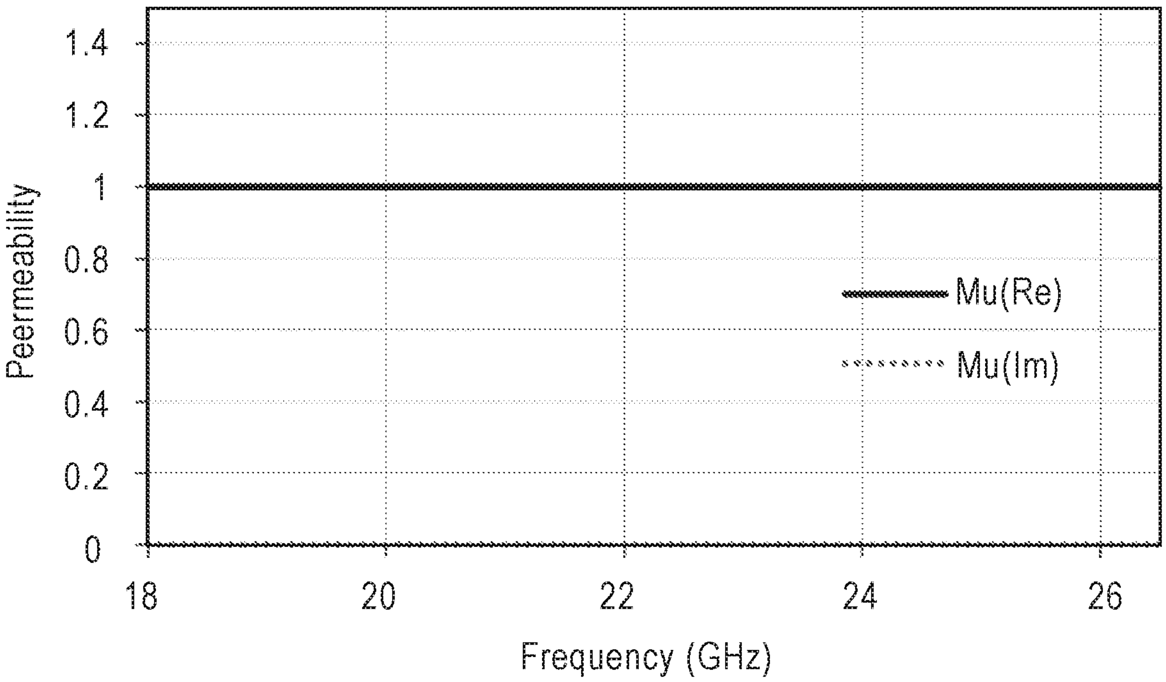

The scattering parameters of the test samples that correspond to the reflection (S11 and S22) and transmission (S21 and S12) of an electromagnetic (EM) wave were measured using the microwave vector network analyzer. The real and the imaginary components of the complex dielectric permittivity and magnetic permeability were determined from the complex scattering parameters using the well-known Baker-Jarvis model. Plots of the real and imaginary parts of dielectric permittivity and magnetic permeability vs. frequency (18-26 GHz) are presented in FIGS. 3 and 4 for $ZrO_2$ (70 weight percent loading in silicone polymer matrix) filler composite, in FIGS. 5 and 6 for $BaZrTiO_3$ (70 weight percent loading in silicone polymer matrix) filler composite, and in FIGS. 7 and 8 for $BaTiO_3$ (70 weight percent loading in silicone polymer matrix) filler composite.

Modeling Reflection and Transmission

Once the fundamental electromagnetic properties of a composite are characterized over a frequency range, it is possible to calculate the performance of the composite as an electromagnetic absorber using different models.

The performance of an electromagnetic reflector is highly dependent on the use case scenario as well as its fundamental properties. One such well known model, known as a free space model, assumes that electromagnetic wave is normally incident on a composite layer. In this model, the EM wave performances are investigated based on the following equations 1 and 2, below:

$$Z_{in} = Z_0\sqrt{\mu_r/\epsilon_r}\,\tanh\{j(2\pi ft/c)\sqrt{\mu_r\epsilon_r}\} \quad (1)$$

$$RL = 20\log\left[\frac{(Z_{in}-Z_0)}{(Z_{in}-Z_0)}\right] \quad (2)$$

where $Z_0$ is the impedance of free space, t is the thickness of the absorber, and c is the speed of light. As indicated in Eq. (1), the input impedance of an absorber depends on six parameters: the real (μ') and imaginary parts (μ") of complex permeability ($\mu_r$=μ'−jμ") and the real (ε') and imaginary parts (ε") of complex permittivity ($\varepsilon_r$=ε'−jε") values, where (tanh) represents hyperbolic tangent function while (j) represents the "imaginary unit in a complex function", (t) is the thickness of an absorber (t), and the working frequency is (f).

Details about the model can be found in the reference: "Structural and high GHz frequency EMI (Electromagnetic Interference) properties of carbonyl iron and boron nitride hybrid composites", Materials Research Express 6 (10), 106305, 2019

Using the model and equations described above, and using the dielectric and magnetic properties measured above for composite layers, a Python software program was used to determine and model the reflection and transmission results for various use case scenarios.

Comparative Example 1 (CE-1)

Figure 9A:
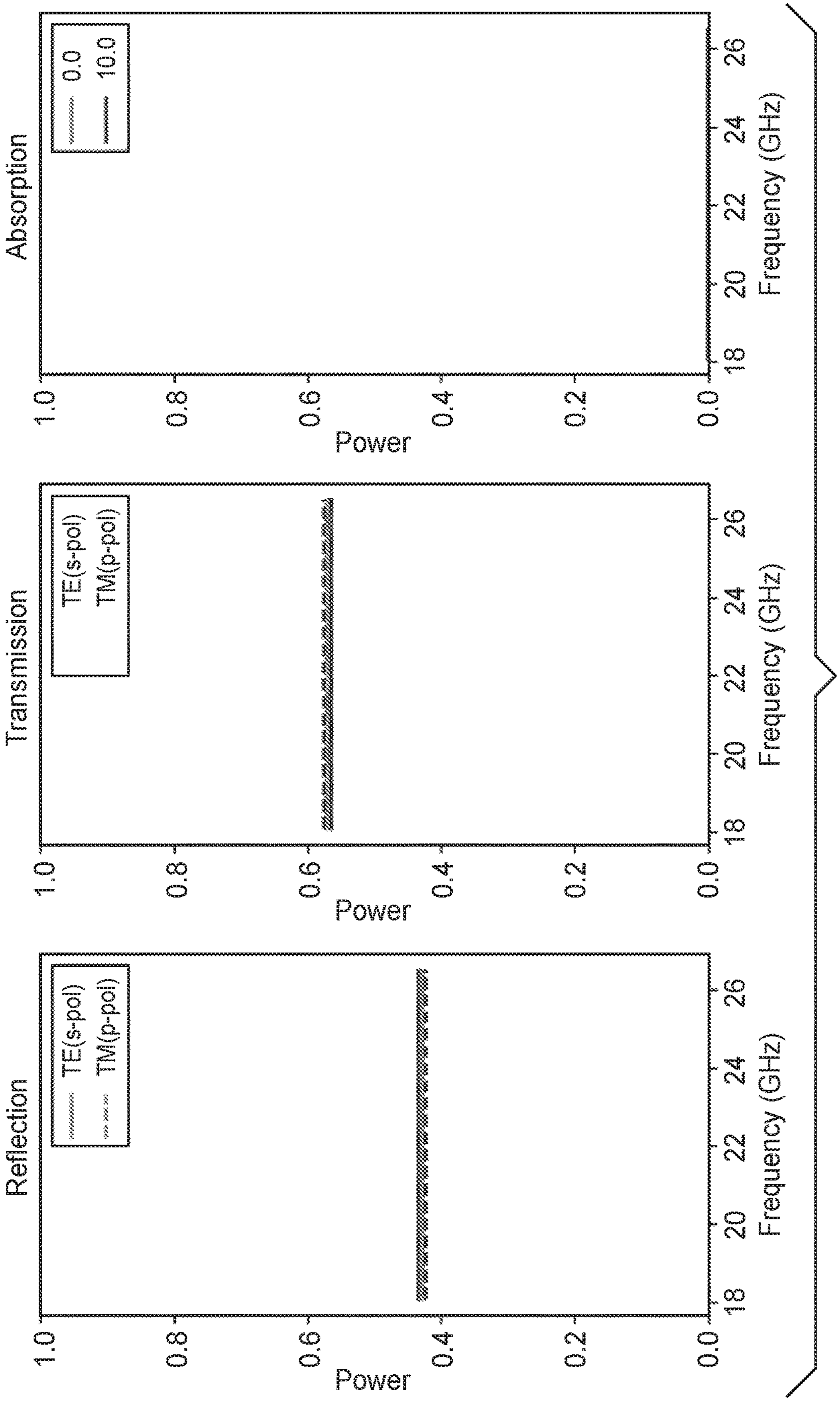
FIGS. 9A and 9B report calculated EM (electromagnetic) characteristics (linear power) showing the reflection, transmission and absorption characteristics in the 18-26.5 GHz frequency range and incident angle of 1-10°, and transmission characteristics (s and p-polarization of the EM wave) as a function of incident angle and frequency (where lighter color indicates better transmission), respectively, for Comparative Example 1.
Figure 9B:
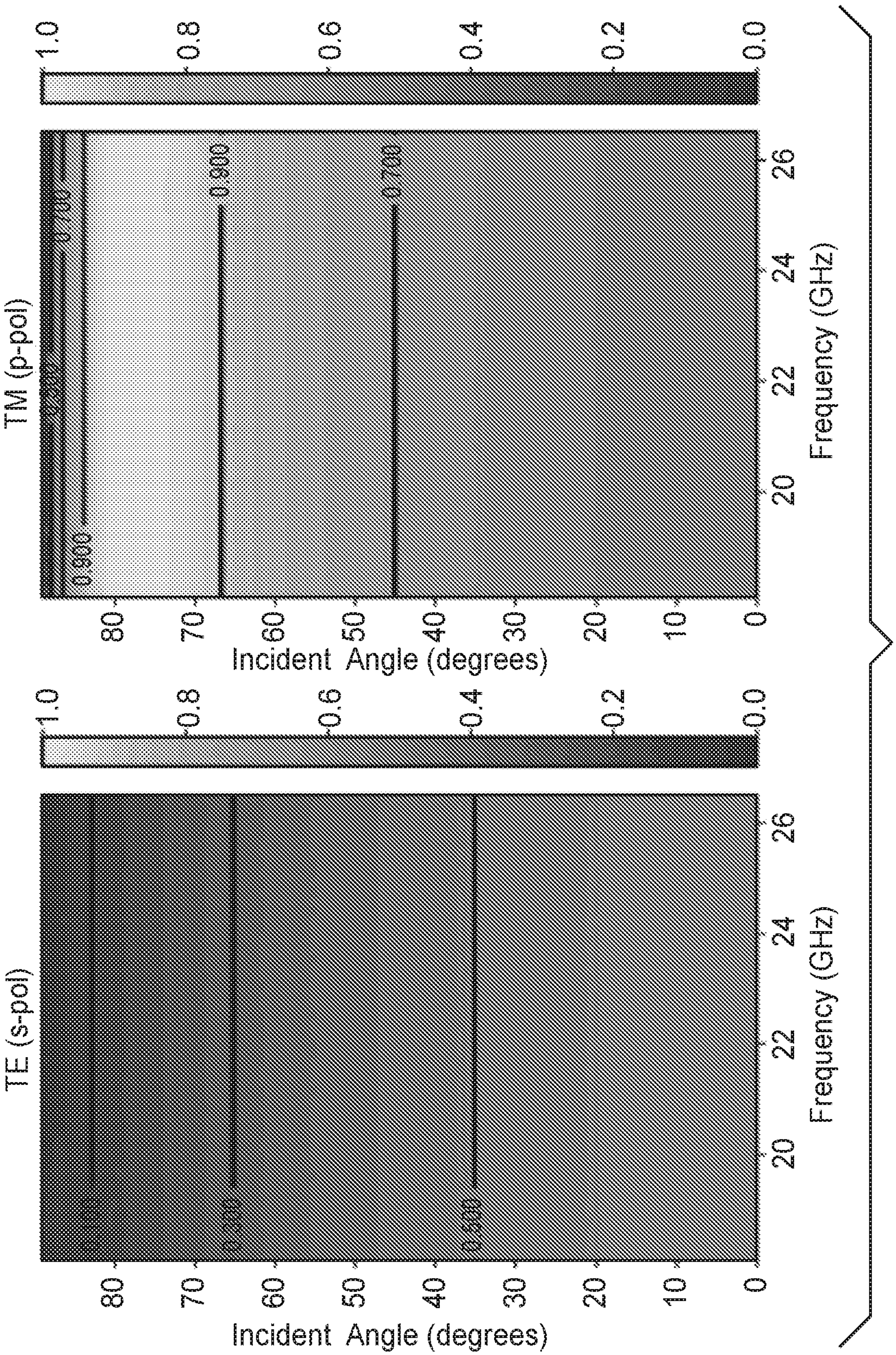

For CE-1, transmission and reflection characteristics of a bulk ceramic $ZrO_2$ base layer without AR film was modeled. The EM properties for bulk ceramic $ZrO_2$ assumed are reported in Table 2, as provided in OH et al., "Microwave dielectric properties of zirconia fabricated using NanoParticle Jetting", *Additive Manufacturing,* 2019, v27, pp 586-594. The sample thickness modeled was 0.45 mm. FIGS. 9A and 9B report calculated EM (Electromagnetic) characteristics (linear power) showing the reflection, transmission and absorption characteristics in the 18-26.5 GHz frequency range and incident angle of 1-10°, and transmission characteristics (s and p-polarization of the EM wave) as a function of incident angle and frequency (where lighter color indicates better transmission), respectively.

TABLE 2

| MATERIAL | FREQUENCY, GHz | ε' (Real) | ε'' (Imaginary) | μ' (Real) | μ'' (Imaginary) |
|---|---|---|---|---|---|
| $ZrO_2$ | 18-26.5 | 23 | 0.0299 | 1 | 0 |

Comparative Example 2 (CE-2)

Figure 10A:
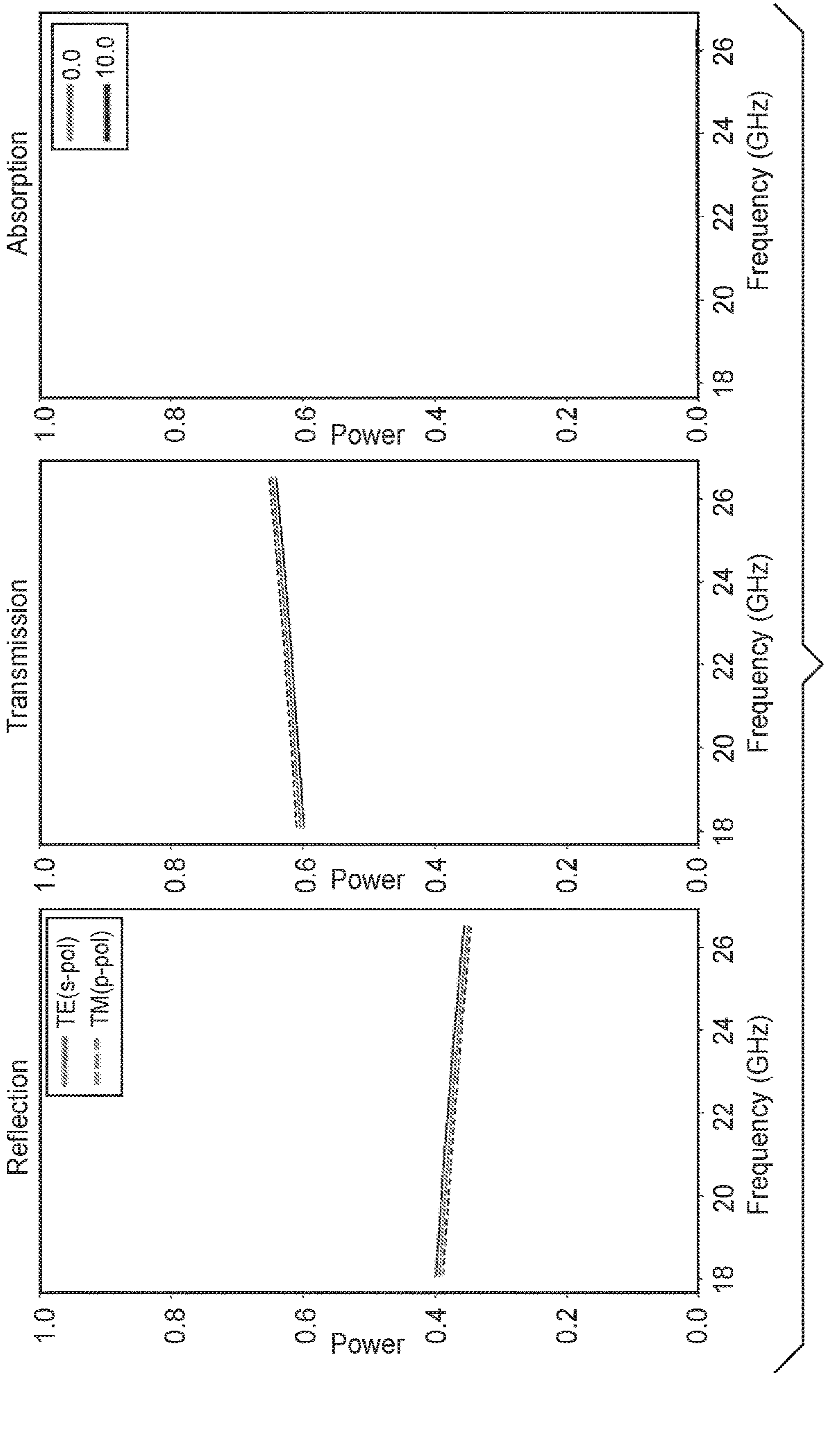
FIGS. 10A and 10B report calculated EM (electromagnetic) characteristics (linear power) showing the reflection, transmission and absorption characteristics in the 18-26.5 GHz frequency range and incident angle of 1-10°, and transmission characteristics (s and p-polarization of the EM wave) as a function of incident angle and frequency (where lighter color indicates better transmission), respectively, for Comparative Example 2.
Figure 10B:
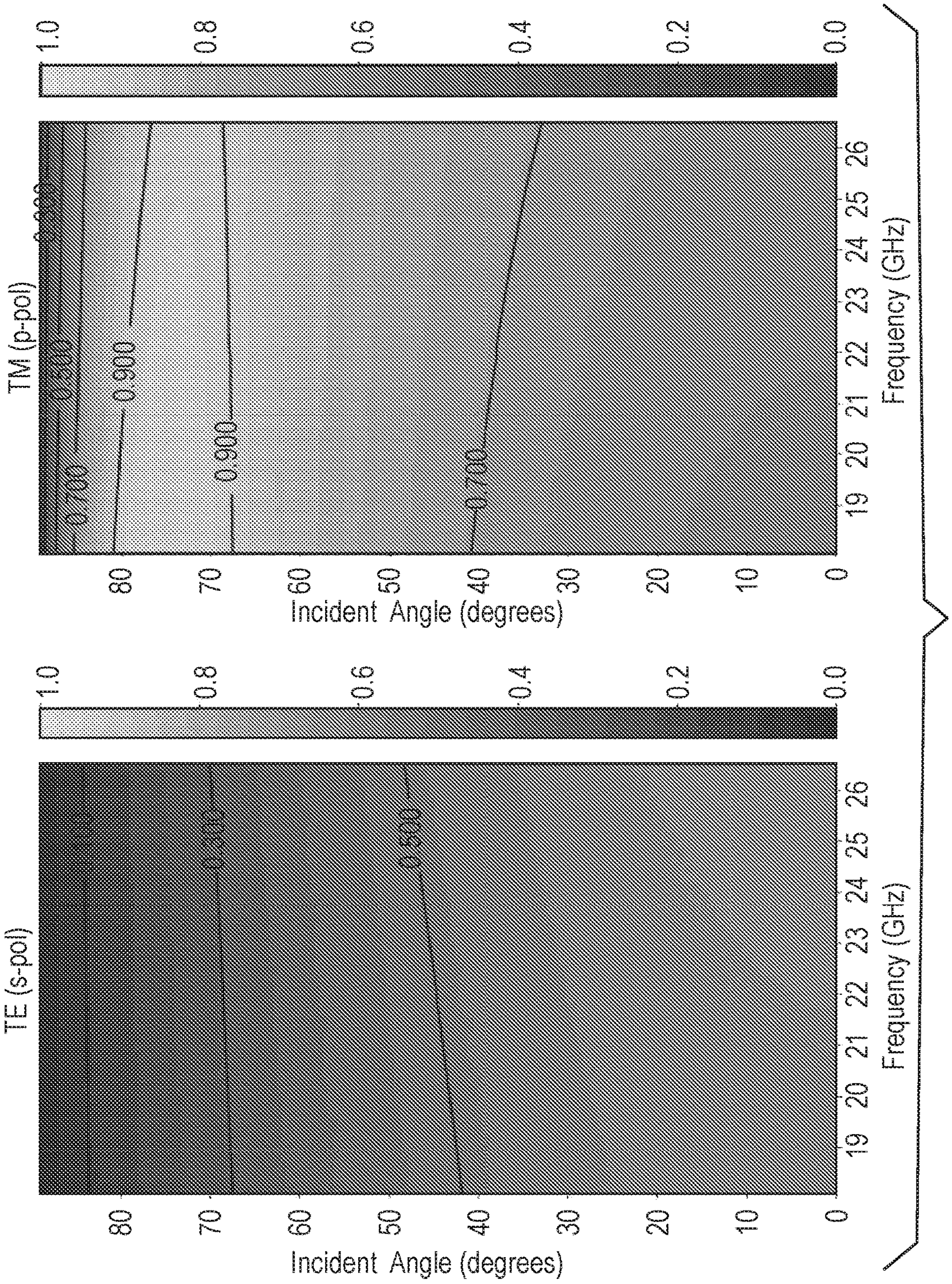

For CE-2, transmission and reflection characteristics of a single layer of $ZrO_2$ silicone composite, 70 wt. % $ZrO_2$ loading, 0.45 mm thickness, on top of a bulk ceramic zirconia base layer of thickness 0.45 mm. FIGS. 10A and 10B report calculated EM (Electromagnetic) characteristics (linear power) showing the reflection, transmission and absorption characteristics in the 18-26.5 GHz frequency range and incident angle of 1-10°, and transmission characteristics (s and p-polarization of the EM wave) as a function of incident angle and frequency (where lighter color indicates better transmission), respectively.

Comparative Example 3 (CE-3)

Figure 11A:
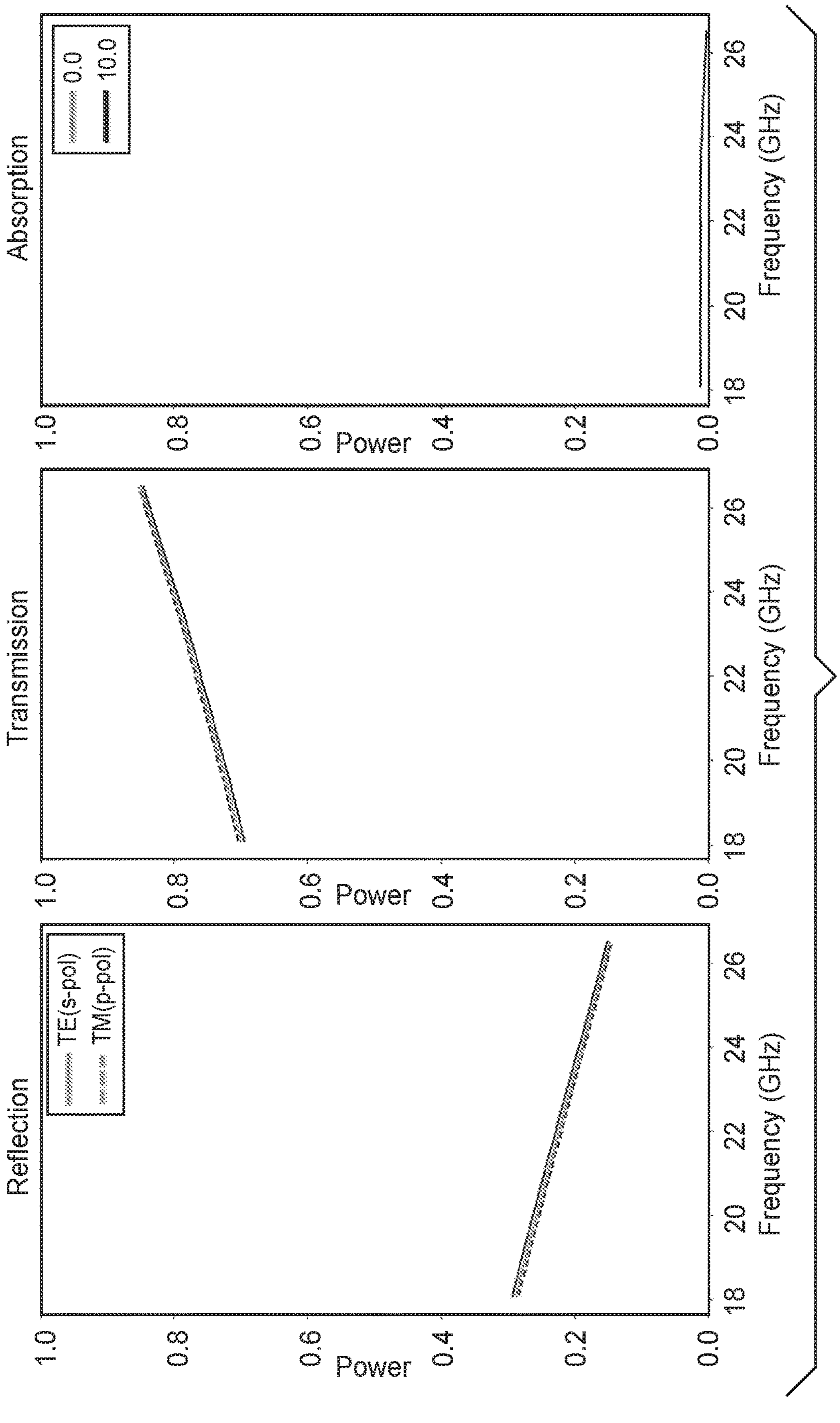
FIGS. 11A and 11B report calculated EM (electromagnetic) characteristics (linear power) showing the reflection, transmission and absorption characteristics in the 18-26.5 GHz frequency range and incident angle of 1-10°, and transmission characteristics (s and p-polarization of the EM wave) as a function of incident angle and frequency (where lighter color indicates better transmission), respectively, for Comparative Example 3.
Figure 11B:
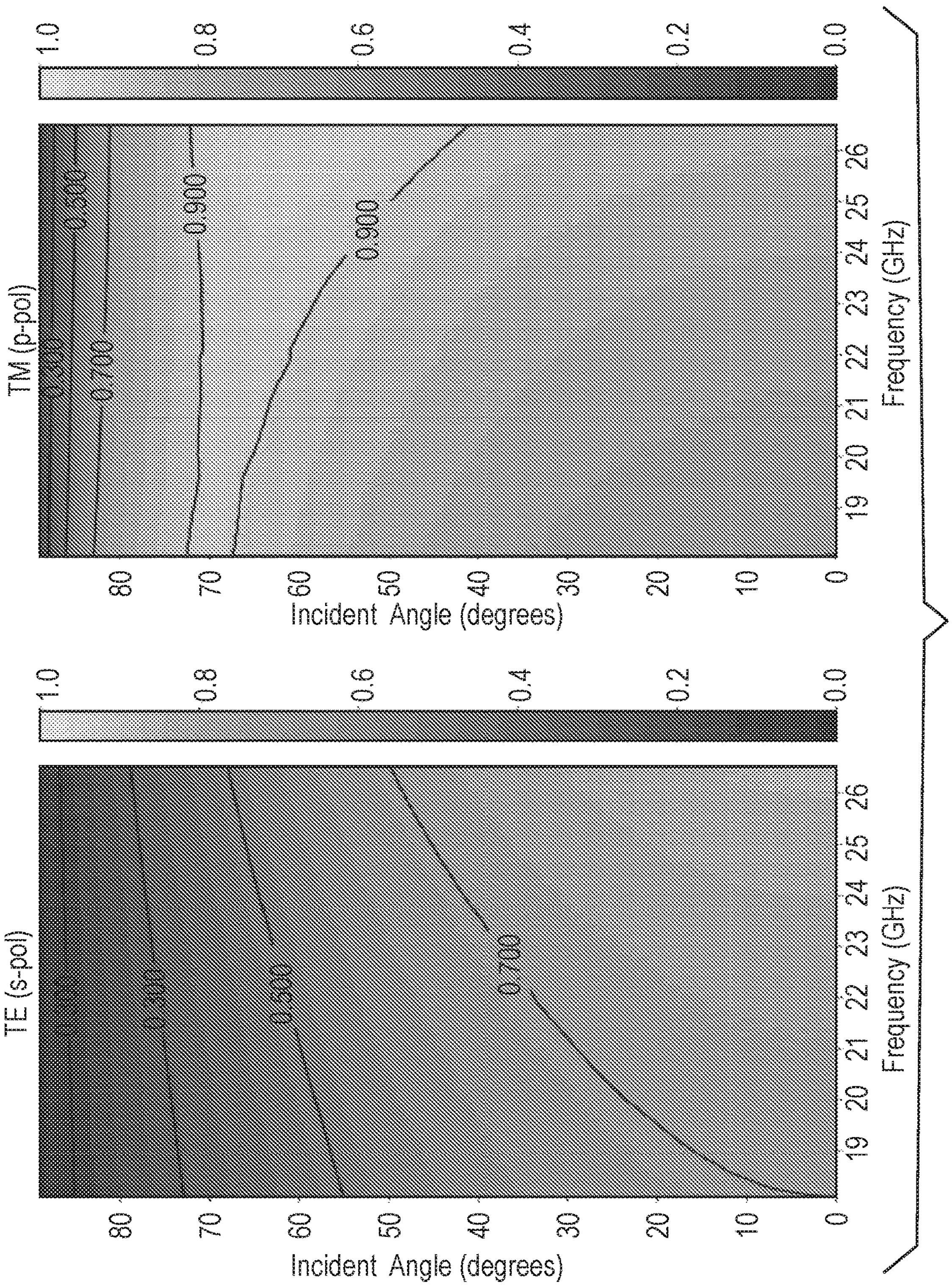

For CE-3, transmission and reflection characteristics of single layer of $BaTiO_3$ silicone composite, 70 weight percent (wt. %) $BaTiO_3$ loading, 0.45 mm, on top of a bulk ceramic zirconia base layer of thickness 0.45 mm. FIGS. 11A and 11B report calculated EM (Electromagnetic) characteristics (linear power) showing the reflection, transmission and absorption characteristics in the 18-26.5 GHz frequency range and incident angle of 1-10°, and transmission characteristics (s and p-polarization of the EM wave) as a function of incident angle and frequency (where lighter color indicates better transmission), respectively.

Comparative Example 1 (CE-4)

Figure 12A:
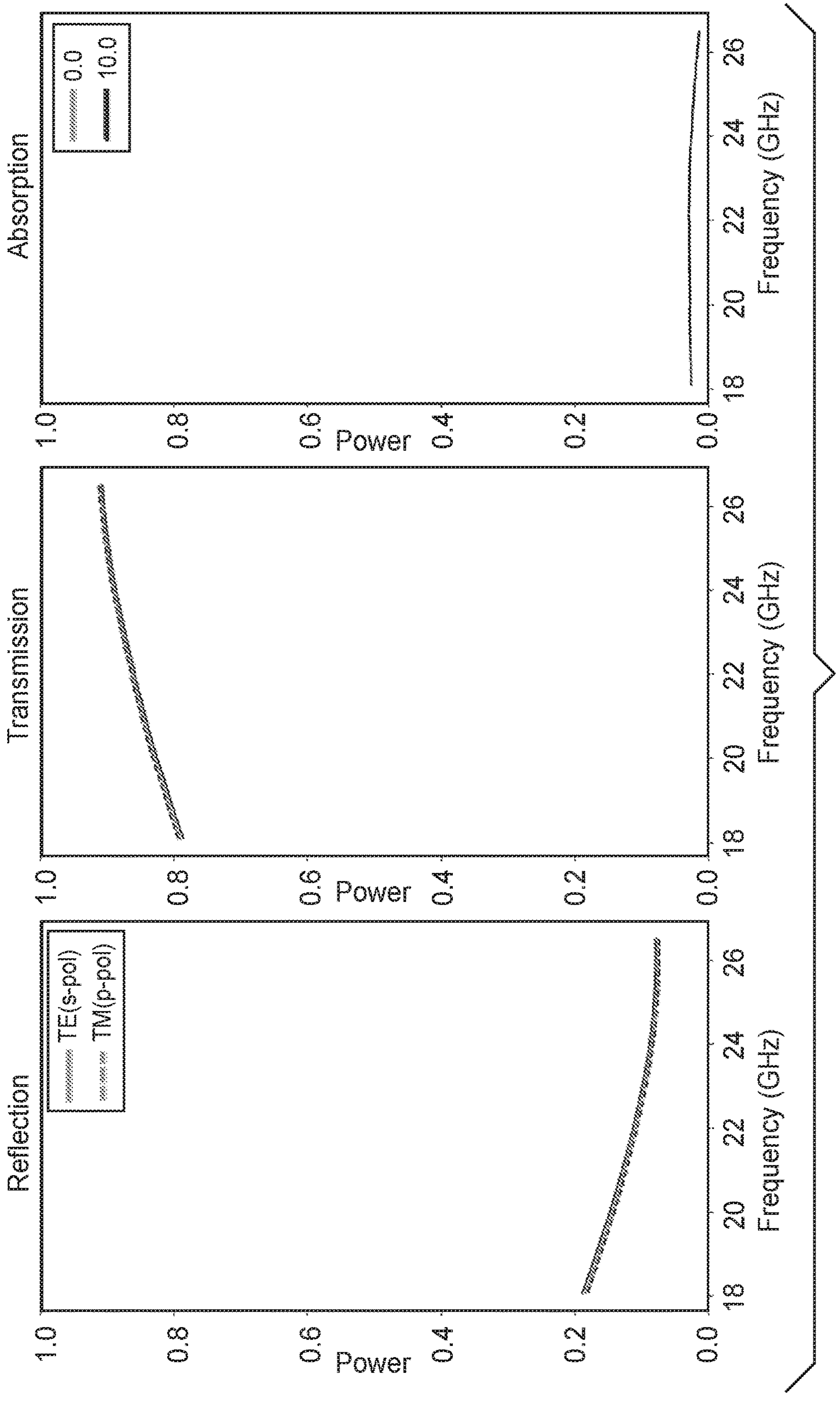
FIGS. 12A and 12B report calculated EM (electromagnetic) characteristics (linear power) showing the reflection, transmission and absorption characteristics in the 18-26.5 GHz frequency range and incident angle of 1-10°, and transmission characteristics (s and p-polarization of the EM wave) as a function of incident angle and frequency (where lighter color indicates better transmission), respectively, for Comparative Example 4.
Figure 12B:
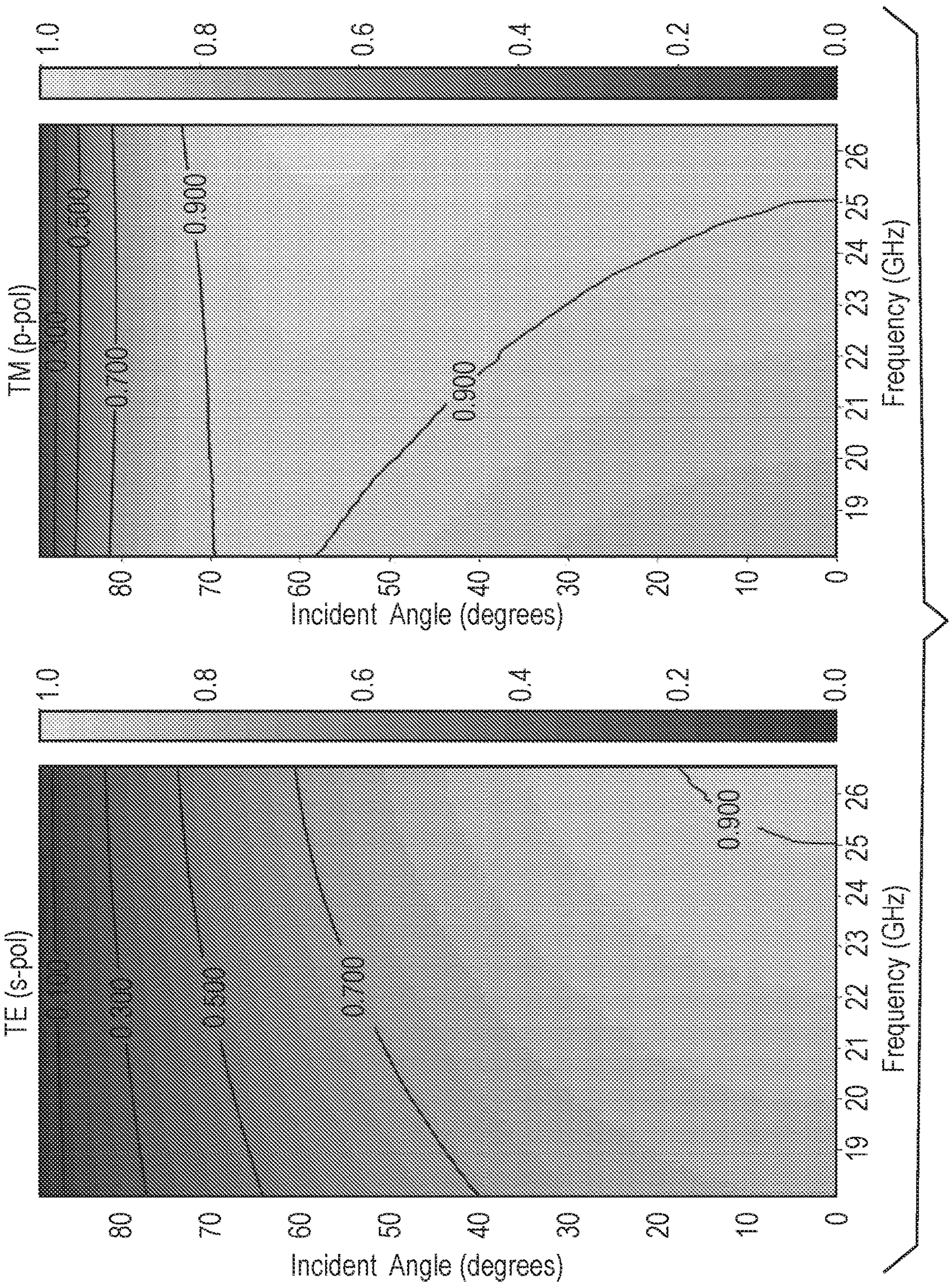

For CE-4, transmission and reflection characteristics of layer of $ZrO_2$ silicone composite, 70 wt. % loading, 0.45 mm, and a layer of $BaTiO_3$ silicone composite, 70 wt. % loading, 0.45 mm on top of a bulk ceramic zirconia base layer of thickness 0.45 mm. FIGS. 12A and 12B present calculated EM (Electromagnetic) characteristics (linear power) showing the reflection, transmission and absorption characteristics in the 18-26.5 GHz frequency range and incident angle of 1-10°, and transmission characteristics (s and p-polarization of the EM wave) as a function of incident angle and frequency (where lighter color indicates better transmission) respectively.

Example 1 (EX-1)

Figure 13A:
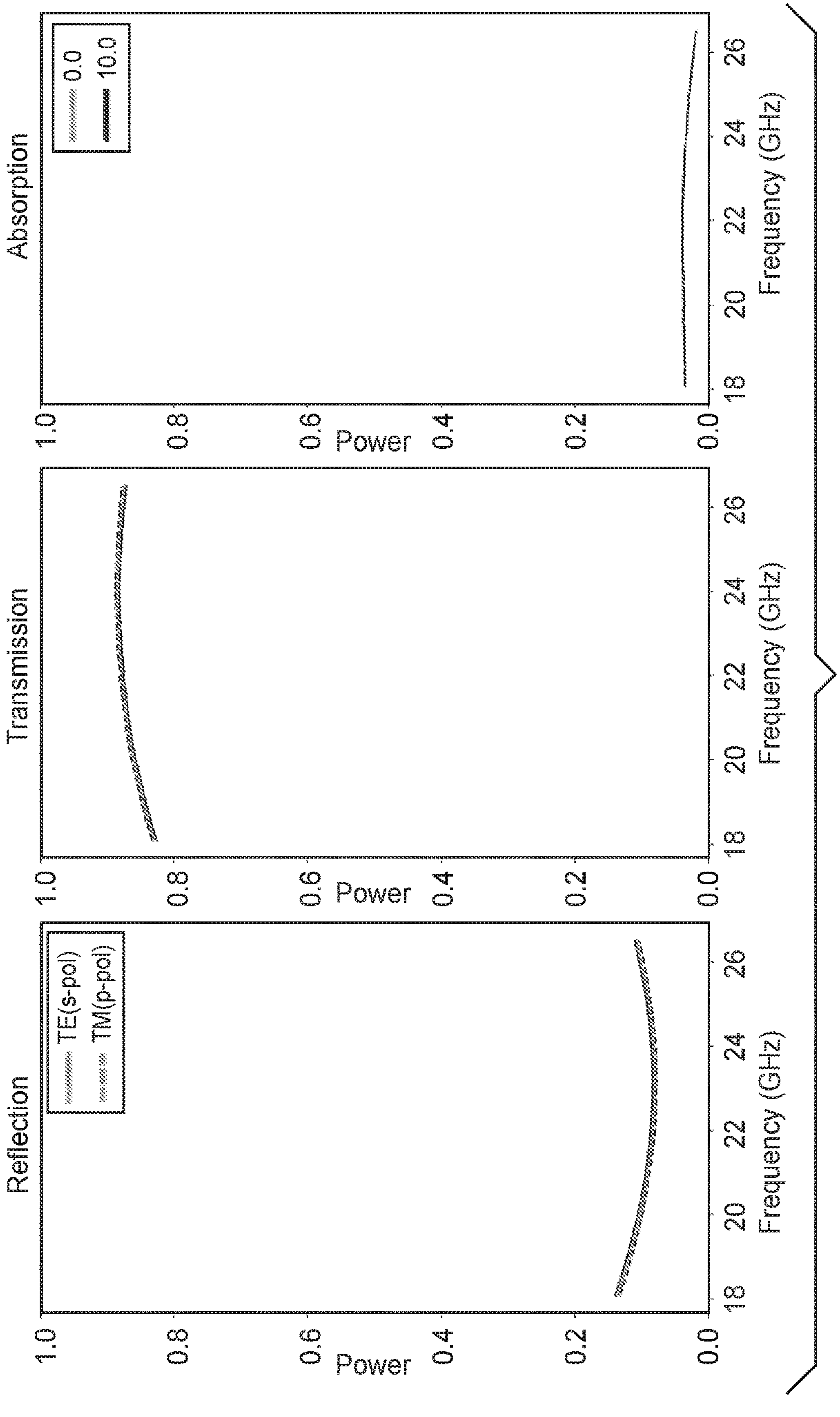
FIGS. 13A and 13B report calculated EM (electromagnetic) characteristics (linear power) showing the reflection, transmission and absorption characteristics in the 18-26.5 GHz frequency range and incident angle of 1-10°, and transmission characteristics (s and p-polarization of the EM wave) as a function of incident angle and frequency (where lighter color indicates better transmission), respectively, for Example 1.
Figure 13B:
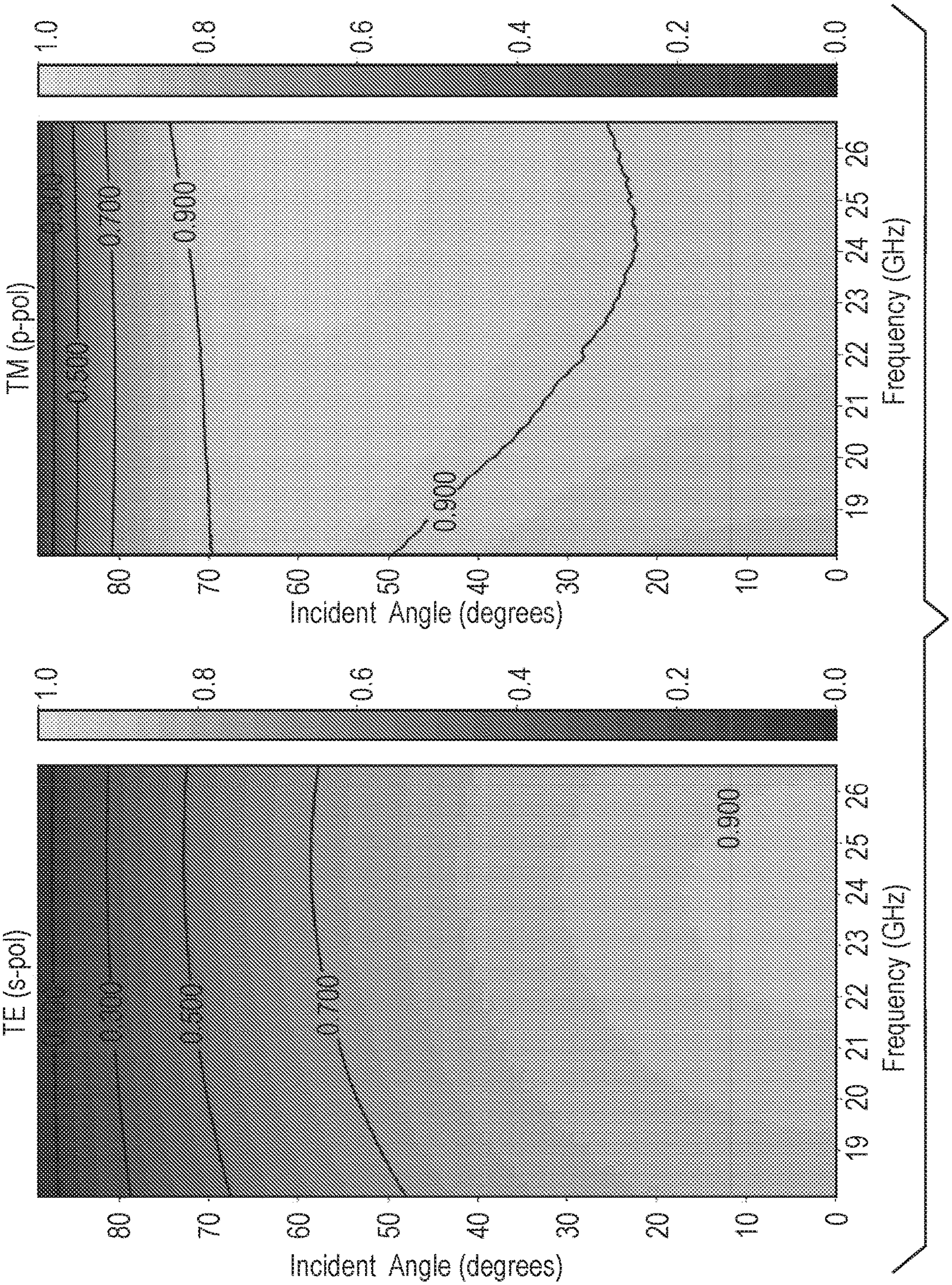

For EX-1, transmission and reflection characteristics of layer of $ZrO_2$ silicone composite, 70 wt. % loading, 0.45 mm, a layer of $BaZrTiO_3$ silicone composite, 70 wt. % loading, 0.45 and a layer of $BaTiO_3$ silicone composite, 70 wt. % loading, 0.45 mm on top of a bulk ceramic zirconia base layer of thickness 0.45 mm. FIGS. 13A and 13B report calculated EM (Electromagnetic) characteristics (linear power) showing the reflection, transmission and absorption characteristics in the 18-26.5 GHz frequency range and incident angle of 1-10°, and transmission characteristics (s and p-polarization of the EM wave) as a function of incident angle and frequency (where lighter color indicates better transmission), respectively.

The preceding description, given in order to enable one of ordinary skill in the art to practice the claimed disclosure, is not to be construed as limiting the scope of the disclosure, which is defined by the claims and all equivalents thereto.

What is claimed is:

1. An anti-reflective assembly comprising:
a substrate comprising a ceramic and having first and second major surfaces, wherein the substrate has a dielectric permittivity of at least 10 over at least an 8 gigahertz continuous portion of an electromagnetic frequency range from 3 to 40 gigahertz, inclusive;
an adhesive layer disposed on at least a portion of the first major surface; and
a nonporous multilayer anti-reflective film contacting the adhesive layer and disposed proximate to the substrate, the nonporous multilayer anti-reflective film comprising sequential first, second, and third layers, wherein:
the first layer comprises a first polymer matrix containing first filler particles, wherein over the at least an 8 gigahertz continuous portion of the electromagnetic frequency range, the first layer has a first dielectric permittivity of 10 to 15 and a first dielectric loss tangent of 3 percent or less;
the second layer comprises a second polymer matrix containing second filler particles, wherein over the at least an 8 gigahertz continuous portion of the electromagnetic frequency range, the second layer has a second dielectric permittivity of 3 to 10 and a second dielectric loss tangent of 3 percent or less; and
the third layer comprises a third polymer matrix containing third filler particles, wherein over the at least an 8 gigahertz continuous portion of the electromagnetic frequency range, the third layer has a third dielectric permittivity of 1 to 5 and a third dielectric loss tangent of 3 percent or less,
wherein the first dielectric permittivity is greater than the second dielectric permittivity, and the second dielectric permittivity is greater than the third dielectric permittivity.

2. The anti-reflective assembly of claim 1, wherein the adhesive layer has an thickness of 100 microns or less.

3. The anti-reflective assembly of claim 1, wherein the second layer is sandwiched between and contacted by the first and third layers.

4. The anti-reflective assembly of claim 1, wherein the substrate comprises at least one of zirconia, doped zirconia, sapphire, or silicon nitride.

5. The anti-reflective assembly of claim 1, wherein the substrate comprises at least portion of a case for a 5G-enabled telecommunication device including a 5G-enabled cellular phone.

6. The anti-reflective assembly of claim 1, wherein the first filler particles comprise a ceramic having a fourth dielectric permittivity of at least 100.

7. The anti-reflective assembly of claim 1, wherein the second filler particles comprise ceramic having a fifth dielectric permittivity of at least 50 and less than 100.

8. The anti-reflective assembly of claim 1, wherein the third filler particles comprise ceramic having a sixth dielectric permittivity of at least 10 and less than 50.

9. The anti-reflective assembly of claim 1, wherein at least one of the first, second, or third polymer matrices comprises a crosslinked silicone.

10. The anti-reflective assembly of claim 1, wherein the amount of first, second, and third filler particles in the respective first, second, and third layers is at least 60 weight percent.

11. The anti-reflective assembly of claim 1, wherein, on a respective basis, the weight percentage of the first, second, and third filler particles in the first, second, and third layers decreases sequentially.

12. The anti-reflective assembly of claim 1, wherein the first, second, and third filler particles are compositionally the same.

13. The anti-reflective assembly of claim 1, wherein the nonporous multilayer anti-reflective film has a thickness of 0.05 to 1.5 millimeters.

14. The anti-reflective assembly of claim 1, wherein the at least an 8 gigahertz continuous portion of the electromagnetic frequency range is from 18 to 26 gigahertz.

15. The anti-reflective assembly of claim 1, wherein the at least an 8 gigahertz continuous portion of the electromagnetic frequency range is from 18 to 26 gigahertz is from 10 to 18 gigahertz.

16. The anti-reflective assembly of claim 1, wherein the at least an 8 gigahertz continuous portion of the electromagnetic frequency range is from 18 to 26 gigahertz is from 3 to 18 gigahertz.

17. The anti-reflective assembly of claim 1, wherein the at least an 8 gigahertz continuous portion of the electromagnetic frequency range is from 18 to 26 gigahertz is from 26 to 40 gigahertz.

18. The anti-reflective assembly of claim 1, wherein the at least an 8 gigahertz continuous portion of the electromagnetic frequency range is from 18 to 26 gigahertz is from 3 to 40 gigahertz.

19. The anti-reflective assembly of claim 1, wherein the dielectric permittivity and dielectric loss tangent of the nonporous multilayer anti-reflective film does not vary by more than 15 percent over the at least an 8 gigahertz continuous portion of the electromagnetic frequency range.

20. An anti-reflective assembly comprising:

a substrate comprising a ceramic and having first and second major surfaces, wherein the substrate has a dielectric permittivity of at least 10 over at least an 8 gigahertz continuous portion of an electromagnetic frequency range from 3 to 40 gigahertz, inclusive; and a nonporous multilayer anti-reflective film contacting the substrate, the nonporous multilayer anti-reflective film comprising sequential first, second, and third layers, wherein:

the first layer comprises a first polymer matrix containing first filler particles, wherein over the at least an 8 gigahertz continuous portion of the electromagnetic frequency range, the first layer has a first dielectric permittivity of 10 to 15 and a first dielectric loss tangent of 3 percent or less;

the second layer comprises a second polymer matrix containing second filler particles, wherein over the at least an 8 gigahertz continuous portion of the electromagnetic frequency range, the second layer has a second dielectric permittivity of 3 to 10 and a second dielectric loss tangent of 3 percent or less; and the third layer comprises a third polymer matrix containing third filler particles, wherein over the at least an 8 gigahertz continuous portion of the electromagnetic frequency range, the third layer has a third dielectric permittivity of 1 to 5 and a third dielectric loss tangent of 3 percent or less, wherein the first dielectric permittivity is greater than the second dielectric permittivity, and the second dielectric permittivity is greater than the third dielectric permittivity.

* * * * *